(12) United States Patent
Lodeho et al.

(10) Patent No.: US 10,527,196 B2
(45) Date of Patent: Jan. 7, 2020

(54) HOLDING BACK ELONGATE ELEMENTS DURING SUBSEA OPERATIONS

(71) Applicant: Acergy France SAS, Suresnes (FR)

(72) Inventors: Olivier Lodeho, Paris (FR); Johan Janot, Paris (FR); Vincent Loentgen, Chambry (FR)

(73) Assignee: Acergy France SAS, Suresnes (FR)

( * ) Notice: Subject to any disclaimer, the term of this patent is extended or adjusted under 35 U.S.C. 154(b) by 0 days.

(21) Appl. No.: 15/777,202

(22) PCT Filed: Nov. 16, 2016

(86) PCT No.: PCT/IB2016/001803
§ 371 (c)(1),
(2) Date: May 17, 2018

(87) PCT Pub. No.: WO2017/085559
PCT Pub. Date: May 26, 2017

(65) Prior Publication Data
US 2018/0356003 A1 Dec. 13, 2018

(30) Foreign Application Priority Data

Nov. 20, 2015 (GB) .................................. 1520514.9

(51) Int. Cl.
*F16L 1/19* (2006.01)
*F16L 1/235* (2006.01)
(Continued)

(52) U.S. Cl.
CPC ................ *F16L 1/19* (2013.01); *B63B 35/03* (2013.01); *F16L 1/207* (2013.01); *F16L 1/235* (2013.01); *F16L 9/047* (2013.01); *F16L 59/143* (2013.01)

(58) Field of Classification Search
CPC ..... F16L 1/18; F16L 1/19; F16L 1/206; F16L 1/207; F16L 1/235; F16L 9/04; F16L 9/047

See application file for complete search history.

(56) References Cited

U.S. PATENT DOCUMENTS 5,707,089 A 1/1998 Fend
6,334,739 B1 1/2002 Baugh
(Continued)

FOREIGN PATENT DOCUMENTS

FR  2 778 721  11/1999
GB  2 011 011   7/1979
(Continued)

OTHER PUBLICATIONS

API Specification 17J, "Specification for Unbonded Flexible Pipe," American Petroleum Institute, 3d ed. 2008.
(Continued)

*Primary Examiner* — Frederick L Lagman
(74) *Attorney, Agent, or Firm* — Levy & Grandinetti

(57) ABSTRACT

A subsea pipeline coated with a thermally insulating coating has a radially outer surface shaped to define external hold-back formations. In a J-lay operation, the weight load of a pipeline catenary is held back using a complementary bushing or clamp of an installation vessel engaged with the hold-back formations. The weight load is transferred from the catenary to the bushing or clamp by shear forces acting through the coating. The coating extends continuously along the pipe and is interposed between the hold-back formations and the underlying pipe. The hold-back formations may be integral with the coating.

23 Claims, 9 Drawing Sheets

(51) Int. Cl.
*F16L 9/04* (2006.01)
*F16L 1/20* (2006.01)
*B63B 35/03* (2006.01)
*F16L 59/14* (2006.01)

(56) References Cited

U.S. PATENT DOCUMENTS

| | | |
|---|---|---|
| 2001/0033773 A1 | 10/2001 | Baugh |
| 2002/0096610 A1 | 7/2002 | Fernandez |
| 2005/0082056 A1 | 4/2005 | Baxter et al. |
| 2008/0011933 A1 | 1/2008 | Railsback |
| 2009/0304451 A1* | 12/2009 | Geene ............... B63B 35/03 405/154.1 |
| 2011/0226373 A1 | 9/2011 | van Grieken et al. |
| 2011/0260481 A1* | 10/2011 | Baylot ............... F16L 1/19 294/119.1 |
| 2014/0079486 A1 | 3/2014 | Argelli et al. |
| 2014/0334879 A1 | 11/2014 | Van Zandwijk |

FOREIGN PATENT DOCUMENTS

| | | |
|---|---|---|
| GB | 2 370 335 | 6/2002 |
| GB | 2498808 | 7/2013 |
| WO | WO 00/05527 | 2/2000 |
| WO | WO 01/34011 | 5/2001 |
| WO | WO 2009/083937 | 7/2009 |
| WO | WO 2009/153354 | 12/2009 |
| WO | WO 2010/059035 | 5/2010 |
| WO | WO 2010/061280 | 6/2010 |

OTHER PUBLICATIONS

API Specification 5L, "Specification for Line Pipe," American Petroleum Institute, 45th ed. Dec. 2012.
API Recommended Practice 17B, "Recommended Practice for Flexible Pipe," American Petroleum Institute, 5th ed. May 2014.
API Recommended Practice 1111, "Design, Construction, Operation, and Maintenance of Offshore Hydrocarbon Pipelines," American Petroleum Institute, 5th ed. Sep. 2015.

* cited by examiner

HOLDING BACK ELONGATE ELEMENTS DURING SUBSEA OPERATIONS

BACKGROUND OF THE INVENTION

This invention relates to supporting an elongate element from a surface vessel during an offshore operation. An example of such an element is a subsea pipeline that hangs as a catenary from a surface vessel toward the seabed during installation. In the art of subsea operations, supporting such an element may be referred to as 'holding back' or 'hanging off'.

The main methods for installing subsea pipelines are known in the art as reel-lay, S-lay and J-lay.

In reel-lay operations, a pipeline of rigid or flexible pipe is initially spooled onto and stored on a reel on an installation vessel, which visits a coastal spoolbase at which the pipeline is fabricated. During installation offshore, the pipeline is unspooled from the reel and then overboarded into the sea to hang from the vessel as a catenary. Between unspooling and overboarding, the pipeline may pass through various types of equipment, such as tensioners, a tower, a ramp, a stinger or—if the pipeline is of rigid pipe—a straightener. The main hold-back forces are applied to the pipeline by the tensioners and the reel.

In S-lay operations, the pipeline is assembled from pipe joints along a horizontal firing line on an installation vessel offshore. As it is assembled, the pipeline is launched into the sea over a laying ramp or stinger to hang from the vessel as a catenary. The pipeline assumes an S-shape comprising an overbend over the stinger and an opposed sagbend approaching the seabed. Again, the catenary is held back by tensioners on the installation vessel.

In J-lay operations, in contrast, the pipeline is assembled from pipe joints in an upright tower on an installation vessel offshore. The pipeline hangs near-vertically to a sagbend approaching the seabed, thus assuming a J-shape. In this case, the catenary is held back by friction clamps or by a collar arrangement that is co-operable with bushings on the installation vessel. As friction clamps and collar/bushing arrangements are both static relative to the pipeline, this allows the pipelaying equipment of J-lay to be more compact and less massive than the tensioners that typify reel-lay and S-lay.

Pipeline installation in deep water requires the installation vessel to have a high hold-back capacity. This is due to the great weight of the long catenary of pipeline that is suspended between the vessel and the seabed.

The hold-back capacity of tensioners is limited because their endless-loop architecture limits the transverse pressure and consequently the longitudinal friction forces they can apply to a pipeline. For heavy pipelines such as large-diameter rigid pipelines, the weight of the catenary may be great enough to overcome the friction capacity of tensioners that are available to hold the pipeline. Consequently, the J-lay method is favoured for use where the water depth is great (for example, more than about 1000 m) and the pipeline is heavy.

At least two friction clamps or bushings are needed to lower a pipeline in J-lay operations. One of those clamps or bushings is movable reciprocally relative to the J-lay tower in opposed directions parallel to the lay direction to hold back and lower the pipeline in a hand-over-hand arrangement. For example, WO 2010/059035 features a combination of several collars and bushings.

Friction clamps are specifically designed to maximise frictional hold-back forces at the interface with the outer surface of the pipeline. Examples are disclosed in GB 2370335, WO 01/35011, US 2014/334879 and WO 2009/153354. Pads of the friction clamp hold the pipeline with friction generated by radially-inward squeezing force. The pads may have a special design for increasing the surface area of contact. For example, pads of the friction clamp disclosed in US 2014/334879 include protrusions that embed into the surface of the pipeline, to enhance frictional engagement by increasing a contact area between the clamp and the pipe.

In more distant prior art, US 2014/079486 discloses a friction clamp for gripping an umbilical having a smooth outer surface relative to another elongate element such as a pipeline.

The main drawback of friction clamps is their total reliance upon friction. This is disadvantageous because there is nothing to hold the pipeline if it starts to slip through the clamp, for example because the outer surface of the pipeline has a poor surface finish or is wet or oily.

In the alternative of a collar arrangement, also known as a J-lay collar, the collar is a metallic part of the pipeline that defines a radially-projecting ring. Examples are a forged radially-projecting ring welded to the pipeline, or a forging comprising such a ring that is welded to an end of a pipe joint of the pipeline. The collar mechanically engages a hold-back bushing on the pipelaying vessel, thus providing a steady and reliable mechanical connection between the laying equipment and the pipeline. For example, WO 99/01638 discloses collar flanges, whereas WO 2009/083937 discloses a pipe-in-pipe structure with several J-lay collars on the same pipe. US 2011/0226373 and U.S. Pat. No. 6,334,739 provide further examples of J-lay collars, and a J-lay collar is also illustrated in FIGS. 1 and 2, which will be described later.

J-lay collars have various drawbacks, including the cost of the specific forged pieces and the time and complexity of welding them into the pipeline. For example, the area around the interface between a collar and a pipe joint has to be bare steel to allow welding. Also, welding requires specific welding processes and qualifications because the metallurgical quality of the steels to be welded together is not homogeneous. In particular, a seamless pipe joint is made of an extruded billet of carbon steel whereas a forged collar has other phases in its metallurgical composition, being more ferritic or pearlitic.

After welding, a thermal insulation coating has to be applied to cover the full pipe section including the collars. Coating is performed in a work station that is situated beneath the hold-back bushing and so is beneath the welding station, which is risky for offshore crew. The quality and evenness of the thermal insulation coating around the radially-projecting ring of the collar is also a concern: a thermoplastic coating may not bond sufficiently with the discontinuous shape of the steel collar.

Effective thermal insulation is an important requirement for many subsea pipelines, especially those used to transport crude oil or natural gas from subsea wellheads. Oil and gas are present in subterranean formations at elevated temperature and pressure, which may be increased by the injection of fluids such as steam. As collected at the outlet of a wellhead, crude oil is a viscous, multiphasic, pressurised fluid whose temperature is typically around 100° C. to 180° C. but may be higher. If the crude oil is allowed to cool too much, some components of the oil may solidify by mechanisms such as coalescence, precipitation or gelling. The waxes, asphaltenes, hydrates or other solid condensates that appear as a result may form a plug that will clog the pipeline and be difficult to remove. Similar issues may arise in subsea pipelines used to transport natural gas.

Thus, during transportation along the pipeline, the temperature and pressure of the produced fluid have to be kept high enough to ensure a sufficient flow rate. In particular, various measures are taken to ensure that the internal temperature of the pipeline remains high, typically above 65° C. and in some cases above 200° C., despite thermal exchange with seawater which, for example, is at 4° C. below 1000 m depth.

In addition, an oil or gas field must occasionally be shut down for maintenance. During shut-down, production is stopped and so no hot fluid flows through the pipeline. Consequently, to avoid clogging by solid-phase materials, mitigating fluid such as methanol or diesel oil is injected into the pipeline during shut-down. When production restarts, temperature within the pipeline must be increased quickly so that no plugs will form.

It is important to maintain thermal management continuously along the length of a pipeline. Otherwise, 'cold spots' will arise, which increases the likelihood of plugs forming at those locations. J-lay collars increase the risk of cold spots.

Against this background, the invention addresses the conflicting challenges of providing a hold-back system for use in J-lay operations that is inexpensive, reliable and safe for offshore personnel and yet does not jeopardise thermal insulation of a pipeline.

BRIEF SUMMARY OF THE INVENTION

In one sense, the invention resides in a pipe joint for offshore fabrication and installation of a pipeline in a J-lay operation. The pipe joint comprises: a length of pipe; a thermally-insulating coating around the length of pipe; and a radially outer surface shaped to define at least one external radially-projecting hold-back formation, the or each hold-back formation being a ring that extends continuously around the pipe joint circumferentially. The coating extends continuously along the pipe on a radially inner side of the, or each, hold-back formation and is interposed between the, or each, hold-back formation and the pipe.

The, or each, hold-back formation is preferably integral with the coating and may be overmoulded onto the coating or attached to the coating by bonding or welding. For example, the, or each, hold-back formation may be supported by a shell that is bonded or welded to the coating.

It is preferred that the, or each, hold-back formation is wholly or predominantly of plastics material. For example, a hold-back formation could comprise reinforcing fibres in a plastics matrix.

The coating may be a 3LPP coating or a layered coating, such as a 5LPP coating, that comprises at least one layer modified for additional thermal insulation and an outer mechanically-protective layer around the or each modified layer. In that case, the hold-back formations are suitably integral with or attached to the outer mechanically-protective layer.

Advantageously, a series of hold-back formations are disposed in longitudinal succession along the pipe joint.

The, or each, hold-back formation may comprise a circumferentially-extending ridge comprising at least one face that is acutely inclined relative to a central longitudinal axis of the pipe joint. Conveniently, such a ridge may be defined by a pair of oppositely-inclined generally frusto-conical faces that converge with each other in a radially outward direction to terminate in an outer edge or band. In that case, the faces of the pair preferably have differing acute angles of inclination relative to the central longitudinal axis of the pipe joint. More particularly, when the central longitudinal axis of the pipe joint is upright, an upper face of the pair preferably has a greater angle of inclination relative to that axis than a lower face of the pair.

The inventive concept embraces a subsea pipeline comprising at least one pipe joint of the invention.

The inventive concept also finds expression in a complementary hold-back bushing or travelling clamp for use in J-lay operations. The bushing or clamp is annular and has a radially inner surface shaped to engage with one or more external hold-back formations projecting radially from a pipe joint, the or each hold-back formation being a ring that extends continuously around the pipe joint circumferentially.

Preferably, the inner surface comprises at least one circumferentially-extending groove arranged to receive the or each of said hold-back formations, the groove having at least one face that is acutely inclined relative to a central longitudinal axis of the bushing or clamp. A series of grooves may be disposed in longitudinal succession, each groove being arranged to receive a respective hold-back formation, for example.

The or each groove may be defined by a pair of oppositely-inclined generally frusto-conical faces that converge with each other in a radially outward direction. In that case, the faces of the pair suitably have differing acute angles of inclination relative to a central longitudinal axis of the bushing or clamp. In particular, when the central longitudinal axis of the bushing or clamp is upright, an upper face of the pair advantageously has a greater angle of inclination relative to that axis than a lower face of the pair.

The inventive concept also resides in a combination of the pipe joint of the invention and the bushing or clamp of the invention, the bushing or clamp having one or more internal engagement formations opposed to and complementary with the, or each, hold-back formation of the pipe joint. The inventive concept extends to an installation vessel equipped with one or more bushings or clamps of the invention.

Also within the inventive concept is a method of manufacturing a pipe joint for offshore fabrication and installation of a pipeline in a J-lay operation. The method comprises: applying a thermally-insulating coating onto a length of pipe; and forming or attaching one or more external radially-projecting hold-back formations onto the coating, the or each hold-back formation being a ring that extends continuously around the pipe joint circumferentially.

The method may comprise overmoulding the, or each, hold-back formation onto the coating or bonding or welding the, or each, hold-back formation onto the coating. A shell may be bonded or welded onto the coating, which shell supports one or more hold-back formations.

The inventive concept may also be expressed as a J-lay method for offshore fabrication and installation of a pipeline. The method comprises: attaching a pipe joint to an upper end of a pipe string catenary suspended from an installation vessel, the pipe joint comprising a thermally-insulating coating around a length of pipe, which coating extends continuously along the pipe and is interposed between one or more external radially-projecting hold-back formations and the pipe, the or each hold-back formation being a ring that extends continuously around the pipe joint circumferentially; and holding back a weight load of the catenary using a bushing or clamp of the vessel engaged with the, or each, hold-back formation.

The weight load is suitably transferred from the catenary to the bushing or clamp by shear forces acting through the coating. Preferably, the weight load is transferred from the coating to the bushing or clamp through a lower face of at least one radially-projecting hold-back formation to an opposed face of the bushing or clamp, which faces are inclined at matching acute angles relative to a common central longitudinal axis.

Advantageously, the pipe joint may be loaded onto the installation vessel with the or each hold-back formation already provided on the pipe joint.

In summary, preferred embodiments of the invention provide a radially-projecting plastics formation that is suitably integral with a pipeline coating. Various formation shapes are possible to improve load capacity and to secure the system.

In use in a J-lay operation, the stress path leads from the pipeline to the radially-projecting formation and from there to a purposely-designed complementary hold-back bushing. The axial hold-back load that must be transferred through the coating and the formation is so high in J-lay operations that the formation needs a special design to withstand the resulting shear stress.

As the radially-projecting plastics formation may be preformed or prefabricated on a pipe joint, the only coating that has to be made offshore is a conventional field joint coating between adjoining pipe joints.

The invention provides a method to install a pipeline in seawater, which method comprises: preliminarily manufacturing or otherwise providing a radially-projecting formation on a coating of at least one section of the pipeline, which formation is preferably polymeric; and offshore J-laying a pipeline comprising said section, the weight of the pipeline catenary being held back during at least one step of J-laying by a bushing or clamp of an installation vessel that engages said formation.

The invention also provides a device, equipment or apparatus for laying a pipeline in seawater, the apparatus comprising: at least one radially-projecting formation on at least one coated section of the pipeline, which formation is provided on the coating of the pipeline section; and a complementary bushing or clamp mounted on an installation vessel, which bushing or clamp is suitable to engage the projecting formation and to hold back the tension in a pipeline catenary suspended from the installation vessel via the projecting formation.

The projecting formation may comprise at least two, and preferably at least three, radially-projecting rings that are distinct in the axial direction. The projecting formation is suitably of plastics material or has a plastics matrix containing reinforcements such as fibres. The projecting formation may be bonded to the coating or moulded over the coating.

The projecting formation may be engaged by a static bushing and/or a travelling clamp of a hand-over-hand J-lay installation system.

The invention is primarily concerned with rigid pipelines. In this respect, it is important to understand that the terms 'rigid' and 'flexible' as applied to pipes have clear meanings in the subsea oil and gas industry that differ in important respects from general language. For example, nominally 'rigid' pipes have enough flexibility to be bent if a minimum bend radius is observed. Yet, such pipes are not regarded in the industry as being 'flexible'.

Flexible pipes used in the subsea oil and gas industry are specified in API (American Petroleum Institute) Specification 17J and API Recommended Practice 17B. The pipe body is composed of a composite structure of layered materials, in which each layer has its own function.

The structure of a flexible pipe allows a large bending deflection without a similarly large increase in bending stresses. The bending limit of the composite structure is determined by the elastic limit of the outermost plastics layer of the structure, typically the outer sheath, which limit is typically 6% to 7% bending strain. Exceeding that limit causes irreversible damage to the structure. Consequently, the minimum bending radius or MBR of flexible pipe used in the subsea oil and gas industry is typically between 3 and 6 metres.

Conversely, rigid pipes used in the subsea oil and gas industry are specified in API Specification 5L and Recommended Practice 1111. In contrast to flexible pipes, a rigid pipe usually consists of or comprises at least one pipe of solid steel or steel alloy. However, additional elements can be added, such as an internal liner layer or an outer coating layer. Such additional elements can comprise polymer, metal or composite materials. Rigid pipe joints are typically terminated by a bevel or a thread, and are assembled end-to-end by welding or screwing them together.

The allowable in-service deflection of rigid steel pipe is determined by the elastic limit of steel, which is around 1% bending strain. Exceeding this limit caused plastic deformation of the steel. It follows that the MBR of rigid pipe used in the subsea oil and gas industry is typically around 100 to 300 metres depending upon the cross-sectional dimensions of the pipe.

Whilst rigid pipes have traditionally been of metal, specifically steel, there has been progress in the art toward the use of composite materials for subsea pipes. Such materials typically comprise reinforcing fibres embedded in a polymer matrix. As the bending behaviour of a composite pipe may broadly emulate that of steel pipe in the elastic domain, pipes of composite materials may be regarded as a form of rigid pipe. Thus, if further development in the art leads to the use of composite materials for pipes to be installed by J-lay, the invention could, in principle, be applied to such pipes.

BRIEF DESCRIPTION OF THE SEVERAL VIEWS OF THE DRAWINGS

In order that the invention may be more readily understood, reference will now be made, by way of example, to the accompanying drawings in which.

DETAILED DESCRIPTION OF THE INVENTION

Figure 1:
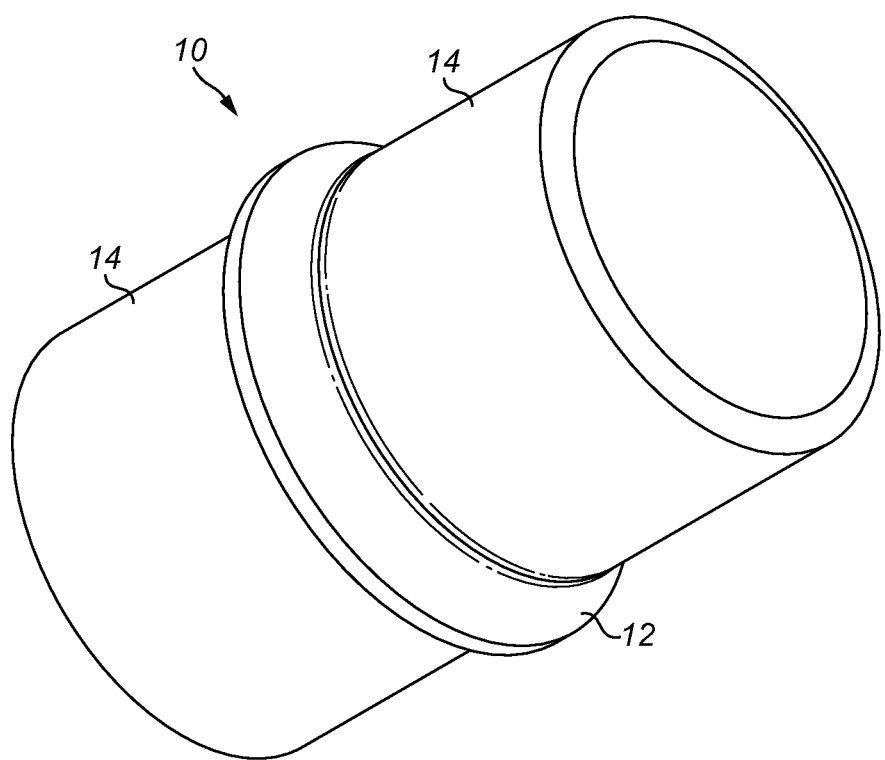
FIG. 1 is a perspective view of a forged steel J-lay collar known in the prior art.
Figure 2:
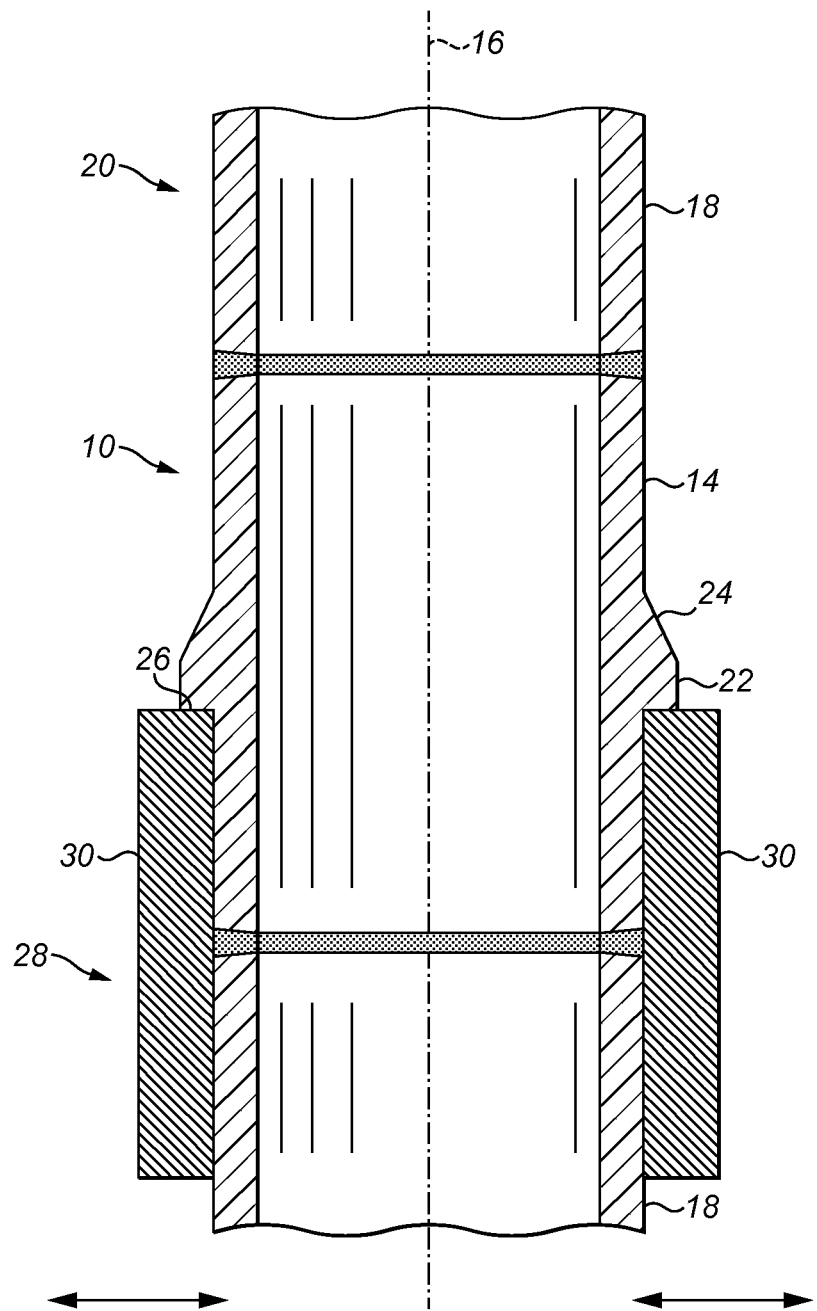
FIG. 2 is a schematic sectional side view through the J-lay collar of FIG. 1, now incorporated by welding into an upright pipeline during a J-lay operation and hanging off a hold-back bushing on an installation vessel.

Referring firstly to FIGS. 1 and 2 of the drawings, a J-lay collar 10 as known in the prior art is a one-piece forging of steel. The collar 10 comprises a circumferential flange 12 disposed between opposed tubular end sections 14.

As shown in FIG. 2, the end sections 14 of the collar 10 are aligned along a mutual central longitudinal axis 16. FIG. 2 also shows that the end sections 14 have end chamfers to facilitate welding to abutting pipe joints 18 that are also aligned along the central longitudinal axis 16. This incorporates the collar 10 into a pipe string 20 that will comprise many such collars 10 and pipe joints 18.

The flange 12 has a radially outer face 22 that encircles the collar 10 as a narrow circumferential band. A frustoconical upper face 24 of the flange 12 extends at a shallow incline from one of the end sections 14 to the outer face 22. A lower face 26 of the flange 12 extends in a radially-outward direction from the other of the end sections 14 to the outer face 22. In this respect, references to 'upper' and 'lower' relate to when the pipe string 20 is oriented upright for J-lay operations as shown in FIG. 2.

It will be noted that the lower face 26 has a much steeper incline than the upper face 24 relative to the end sections 14 and the parallel central longitudinal axis 16; indeed, the lower face 26 extends substantially orthogonally relative to the end section 14 in this example for weight bearing on a bushing 28 as shown in FIG. 2.

Specifically, FIG. 2 shows how the orthogonally-extending lower face 26 of the flange 12 serves as a shoulder to lie on top of, and hence to engage mechanically with, a tubular bushing 28 that encircles the J-lay collar 10 under the flange 12. The bushing 28 comprises bush sections 30 that are movable radially inwardly to come together and engage under the lower face 26 of the flange 12. Conversely, the bush sections 30 are movable radially outwardly to split apart and hence to disengage from the lower face 26 to free the pipe string 20 for lowering through the open bushing 28 toward the sea.

Before reaching the sea, the flange 12 and the surrounding bare metal of the J-lay collar 10 and the adjoining pipe joints 18 must be coated with a protective and thermally-insulating coating. As noted in the introduction, it is problematic to ensure that the coating is continuous around the J-lay collar 10 and robust, especially where the shape of the collar 10 introduces sharp angles that may concentrate stress as the pipe string 20 moves and bends during installation and in use.

The coating operation also introduces a safety risk because offshore personnel must work beneath the J-lay tower of a pipelaying vessel and in particular beneath the level from which the load of the pipeline catenary is suspended. In this respect, when a new pipe joint 18 has been welded to the top of the pipe string 20, the whole catenary must be lifted to make the J-lay collar 10 accessible for coating, typically by injection moulding of a polymer such as polypropylene ('PP') or polyurethane ('PU') using a mould tool positioned around the collar 10.

Figure 3:
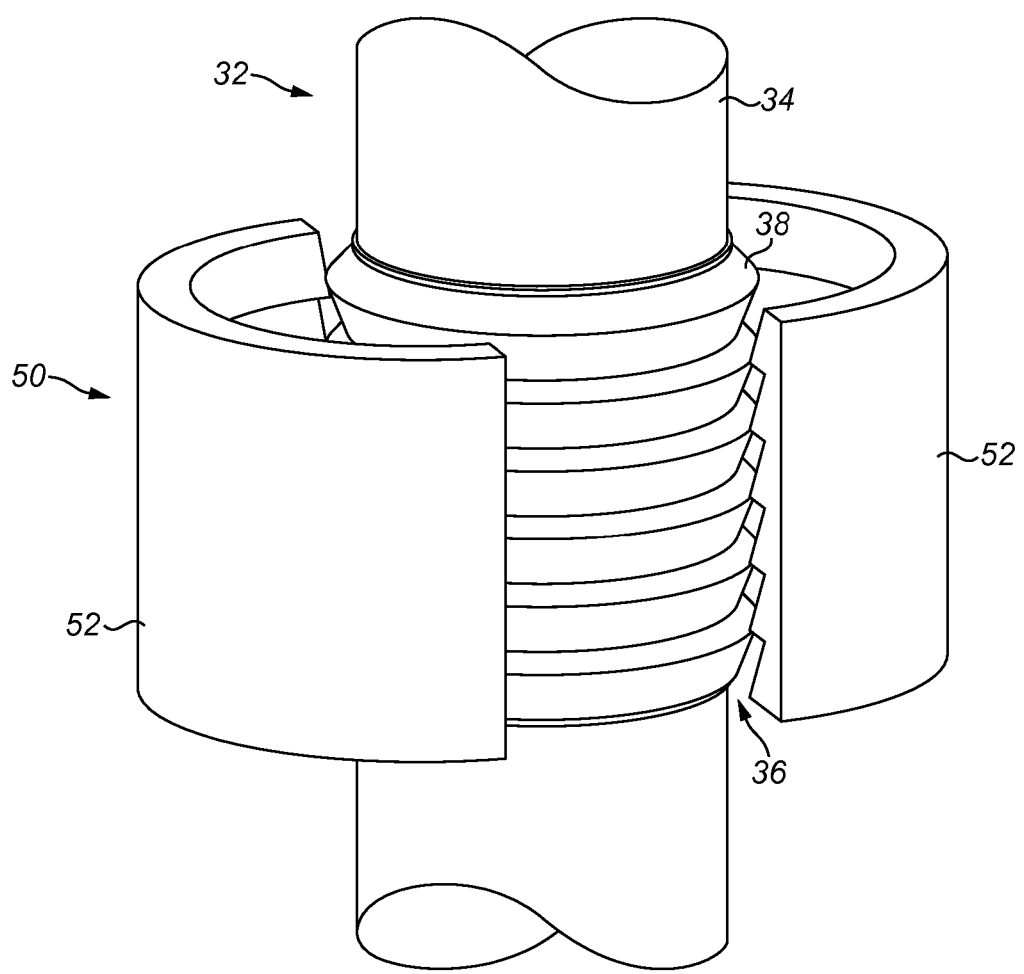
FIG. 3 is a perspective view of a pipeline in accordance with the invention, showing a thermally-insulating coating of the pipeline shaped to define hold-back formations surrounded by a complementarily-shaped hold-back bushing.
Figure 4:
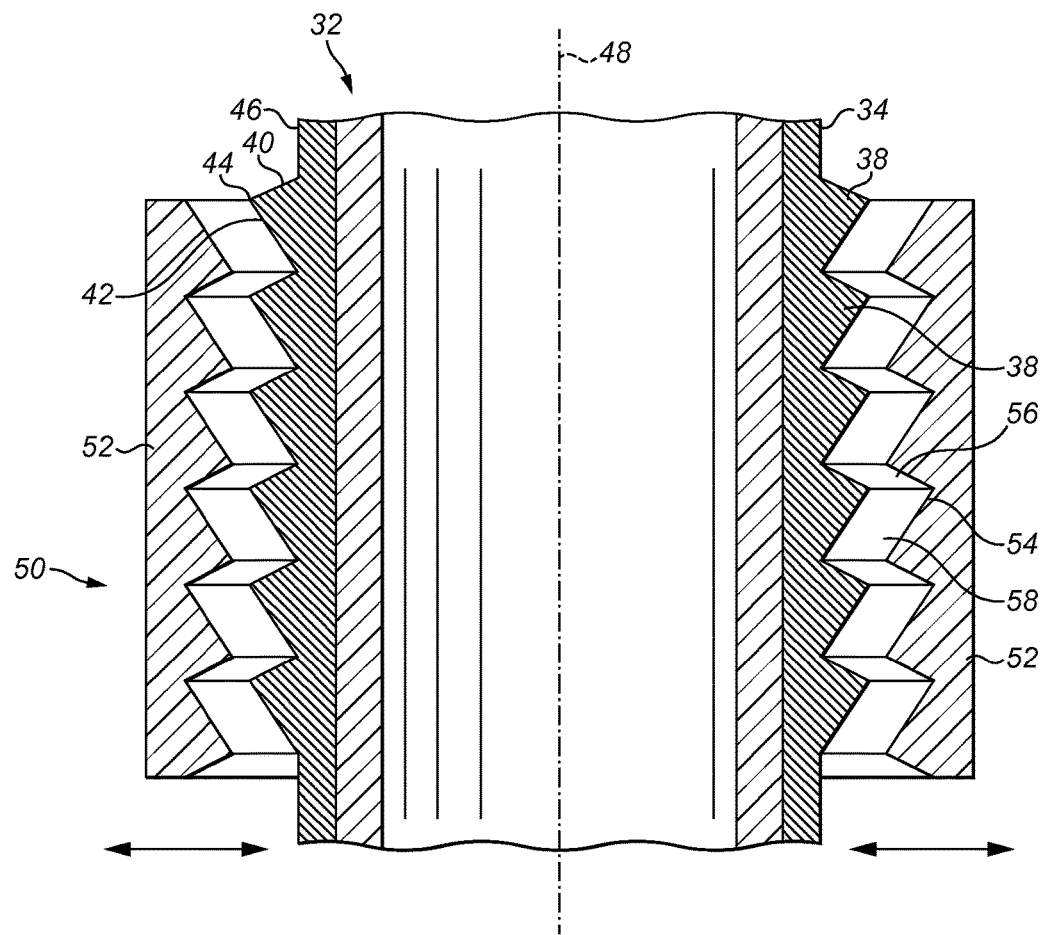
FIG. 4 is a schematic sectional side view through the pipeline and bushing of FIG. 3.

Turning next to FIGS. 3 and 4, these show a pipe joint 32 in accordance with the invention. The pipe joint 32 is suitable for offshore fabrication and installation of a subsea pipeline in a J-lay operation that involves end-to-end welding of successive abutting pipe joints to form a pipe string.

The pipe joint 32 is coated with a longitudinally-continuous, thermally-insulating coating 34 of plastics material. In this example of the invention, the coating 34 has a radially outer surface that is shaped to define integral external hold-back formations 36.

As is conventional in the art, PP may be used as a coating 34 for the pipe joint 32 of the invention. For example, a three-layer PP (3LPP) coating comprises a first layer of epoxy primer, a second thin layer of PP bonded to the primer and a third, thicker layer of extruded PP applied over the second layer. A five-layer PP (5LPP) coating adds two further layers, namely a fourth layer of PP modified for additional thermal insulation, such as glass syntactic PP (GSPP) or a foam, surrounded by a fifth layer of extruded PP for mechanical protection of the insulating fourth layer. Similar additional layers are possible for further thermal insulation, as in a seven-layer PP (7LPP) coating. Other plastics materials such as PU are also possible for the coating 34. In general, thermoplastic polymers or thermoset polymers may be used for coating a pipe joint 32 of the invention.

Unconventionally, the invention removes the need for a separate, expensive forged J-lay collar 10, the need to incorporate such a collar 10 into a pipeline by welding, and the need subsequently to coat the collar 10. The invention does so by instead using the longitudinally-continuous, thermally-insulating coating 34 to support—and preferably, as shown in FIGS. 3 and 4, to define—external hold-back formations 36. In other words, the thermally-insulating coating 34 extends continuously in a longitudinal direction and lies radially inwardly of the hold-back formations 36.

By virtue of this arrangement, the hold-back formations 36 allow a pipe string to be suspended safely in J-lay operations without interrupting the thermal insulation system of the pipeline or requiring a subsequent coating operation to be performed on the pipe string around the hold-back formations 36. This simplifies the pipelaying operation and improves safety; it also saves cost and valuable time.

The hold-back formations 36 shown in FIGS. 3 and 4 comprise an array of circumferential flanges or ribs 38 that project radially from and surround the coated pipe joint 32 as a longitudinal series. The ribs 38 are axially distinct from one another and may be spaced from neighbouring ribs 38 or may abut neighbouring ribs 38.

In effect, the ribs 38 may be regarded as a part of the coating 34 that defines the radially outer surface of the coating 34 in the region of the hold-back formations 36. However, it may also be said that the coating 34 is interposed between the ribs 38 and the underlying steel tube of the pipe joint 32.

In this example, each rib 38 has frusto-conical upper and lower faces 40, 42 that converge in the radially outward direction to meet at an apical circumferential edge 44. However, the upper and lower faces 40, 42 of the ribs 38 could have other shapes; similarly, the edge 44 of a rib 38 could instead be widened to form a circumferential band.

When the pipe joint 32 is upright as in a J-lay operation, the lower face 42 of each rib 38 has a shallower inclination than the upper face 40 relative to the adjoining or underlying outer cylindrical surface 46 of the coated pipe joint 32, which extends parallel to the central longitudinal axis 48. In other words, the lower face 42 is at a smaller and hence more acute angle than the upper face 40 to the outer surface 46 of the pipe joint 32. Put another way, the lower face 42 has a greater longitudinal extent than the upper face 40, being larger, longer or wider in the longitudinal direction than the upper face 40. Thus, the lower face 42 has a greater surface area than the upper face 40.

This relationship between the upper and lower faces 40, 42 of each rib 38 is in complete contrast to the prior art shown in FIGS. 1 and 2, in which the lower face 26 of the flange 12 typically has a much greater inclination than the upper face 24 of the flange 12 relative to the outer surface of an end section 14 of the J-lay collar 10 and indeed simply extends orthogonally from that outer surface.

FIGS. 3 and 4 show how the external hold-back formations 36 engage mechanically with a tubular bushing 50 that encircles the formations. As in the prior art, the bushing 50 comprises bush sections 52 that are movable radially inwardly to come together and engage the hold-back formations 36. Similarly, the bush sections 52 are movable radially outwardly to split apart and hence to disengage from the hold-back formations 36 to free a pipe string comprising the pipe joint 32 for lowering toward the sea.

In the invention, the radially inner faces of the bush sections 52 are shaped to complement the hold-back formations 36, hence comprising circumferentially-extending grooves 54 that each receive a respective one of the ribs 38. The grooves 54 complement the shape of the ribs 38 by each having a steeply-inclined upper face 56 and a shallowly-inclined lower face 58 relative to the central longitudinal axis 48. Thus, the bushing 50 surrounds and embraces the hold-back formations 36, simultaneously engaging multiple ribs 38 in multiple grooves 54 rather than merely sitting under a single flange 12 of a J-lay collar 10 as in the prior art shown in FIGS. 1 and 2. This improves the security of mechanical engagement and beneficially spreads the weight of the suspended pipe joint 32 over a greater length and hence over a greater area of the pipe joint 32 and its coating 34. The result is a capability to sustain a high catenary load, which may for example be in the order of 300 metric tonnes.

It will be apparent that the inverted rib profile of the invention is counter-intuitive when compared to the shoulder profile of prior art J-lay collars. A shoulder is apt for making a conventional J-lay collar because steel can readily withstand shear stress. It has been found that such a shoulder is not apt for the plastics hold-back formations 36 that are enabled by the invention. In the invention, the pipe joint 32 is held back by transferring shear loads through the coating 34 to the bushing 50 via the hold-back formations 36. This gives rise to the reverse-triangle interface profile that characterises preferred embodiments of the invention, which places more material in the lower portions of the hold-back formations 36 defined by the array of ribs 38.

At least the underside or lower face 42 of each rib 38 may be described as triangular, frusto-conical, tapered, downwardly-narrowing or wedge-shaped. The angle of inclination of the underside or lower face 42 is preferably acute relative to the central longitudinal axis 48 and may encompass values around 45°. For example, the best trade-off between maximum area of the surface of contact, loads, and shear stress concentration may be between 35° and 40°.

Figure 5:
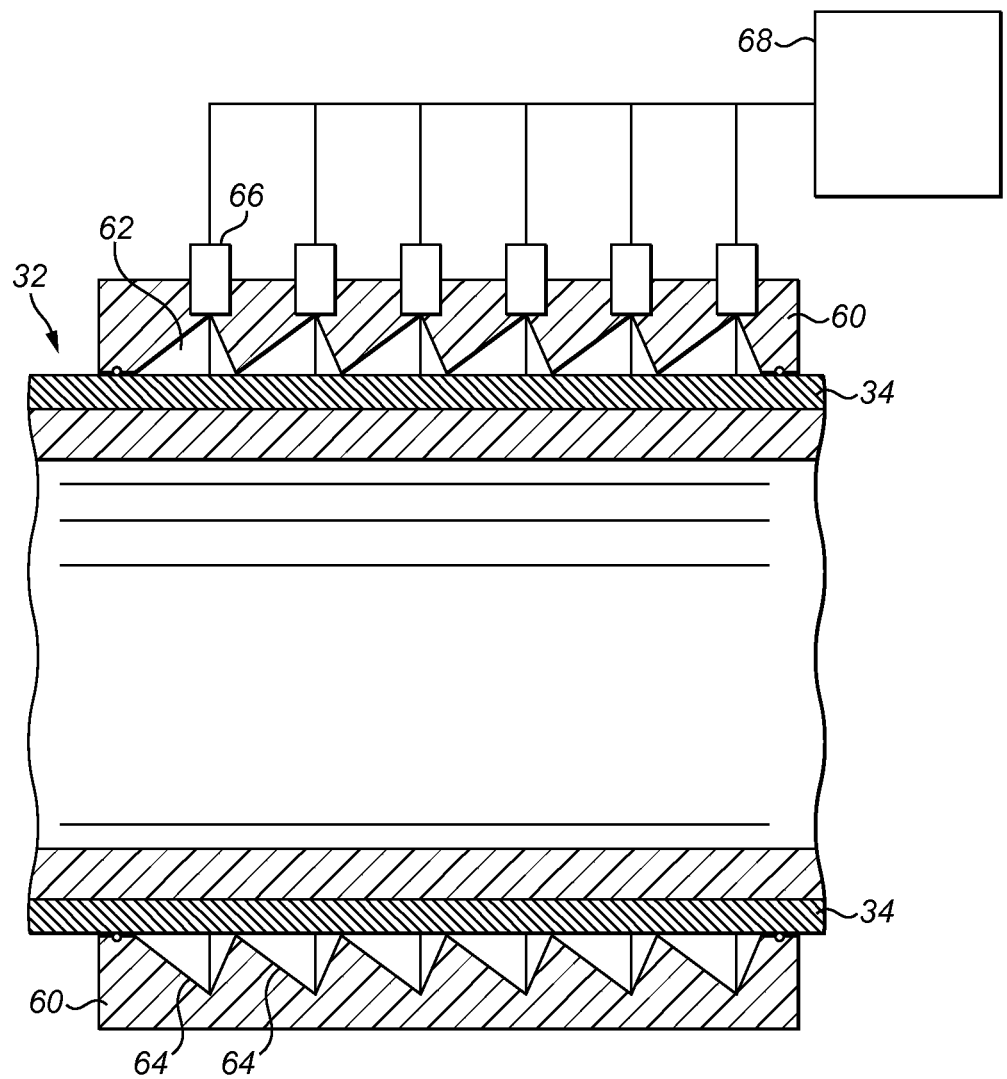
FIG. 5 is a schematic sectional side view through a coated pipeline and a mould tool that encircles the pipeline to overmould the hold-back formations on the coating.

The hold-back formations 36 of the invention can be created or provided in various ways. One example is by over-moulding polymer ribs 38 onto a pre-applied polymer pipe coating 34 as shown in FIG. 5. Here, a tubular mould tool 60 is clamped in part-tubular sections around a coated pipe 32 to define an annular mould cavity 62. The mould tool 60 has a radially inner face comprising a longitudinally-extending series of circumferentially-extending grooves 64 that are shaped to define the ribs 38. Molten thermoplastic polymer or a thermoset resin is injected into the mould cavity through gates 66 supplied from a source 68 such as an injection machine. When the polymer fills the mould cavity 62 and has hardened by cooling or curing, the mould tool 60 is removed to leave the ribs 38 standing proud of the pipe coating 34.

Figure 6A:
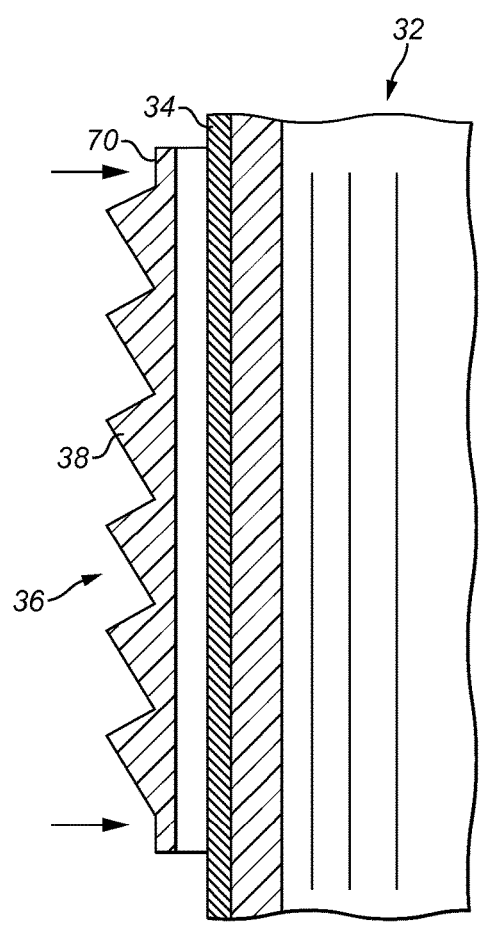
FIGS. 6a and 6b are enlarged detail views showing a variant of the invention in which the hold-back formations are defined by a shell that is shown separately from a coated pipeline in FIG. 6a and bonded or welded to the coating in FIG. 6b.
Figure 6B:
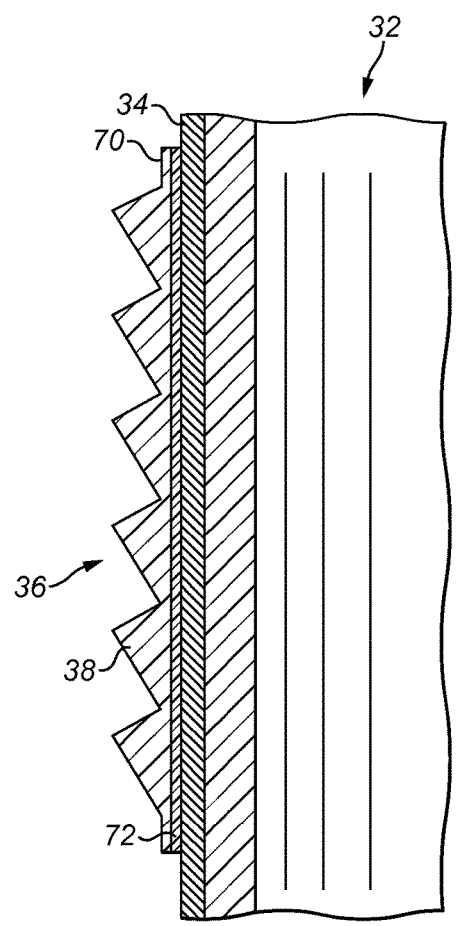

FIGS. 6a and 6b show another approach to providing the hold-back formations of the invention. Here, the ribs 38 are integral with part-tubular shells 70 that are assembled around a coated pipe joint 32 and bonded or welded to the coating 34 of the pipe joint 32. The resulting adhesive bond or weld 72 is shown between the coating 34 and a shell 70 in FIG. 6b. In effect, the ribs 38 then become integral with the coating 34.

The ribs 38 may be moulded integrally with a shell 70 as shown in FIGS. 6a and 6b, the ribs 38 and the shell 70 then both conveniently being of polymer material. However, as the underlying pipe coating 34 will assure continuous thermal insulation, it would in principle be possible for the shell 70 and the ribs 38 instead to be machined, cast or forged of a metal such as steel. Composite materials are also possible for the ribs 38 and/or the shell 70.

Whilst a unifying shell 70 is a convenient way to support and attach multiple ribs 38, one or more ribs 38 could instead be attached to the pipe coating 34 individually by bonding or welding if desired.

Figure 7:
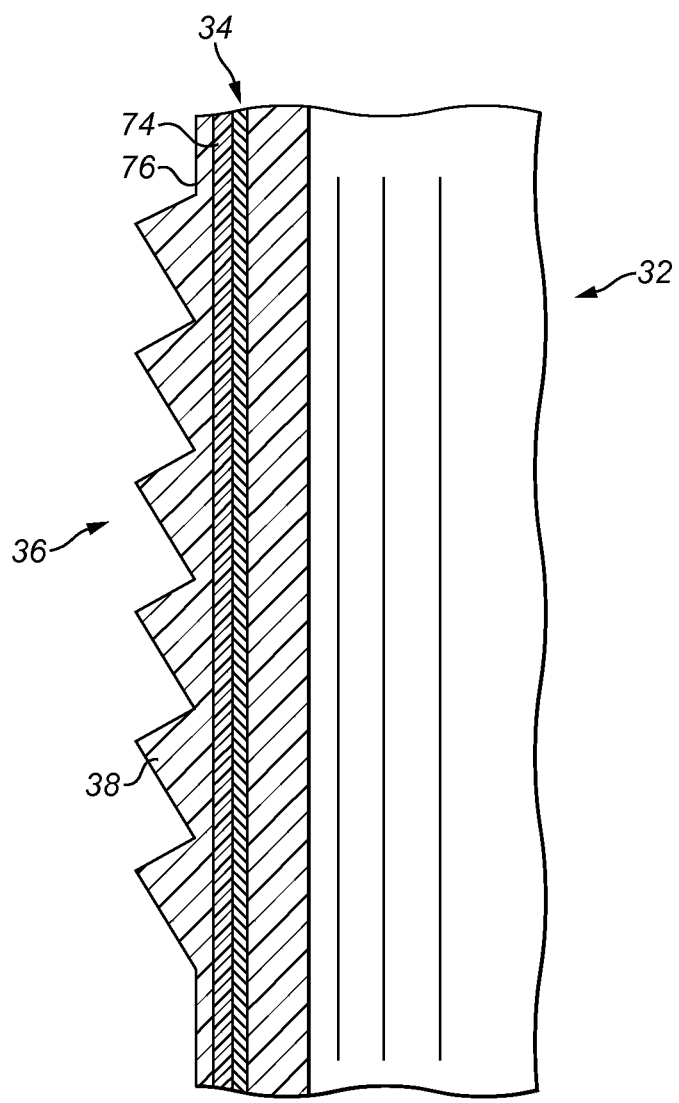
FIG. 7 is an enlarged detail view showing a variant of the invention in which the coating is layered, in this case being a 5LPP coating including a layer of foam insulation.

FIG. 7 shows the coating 34 of a pipe joint 32 comprising a layer 74 of PP modified for additional thermal insulation, such as glass syntactic PP (GSPP) or a foam. Such a layer 74 characterises a 5LPP or 7LPP coating. The modified layer 74 is surrounded by an outer layer 76 of extruded PP for mechanical protection. It will be apparent that the ribs 38 are supported by that outer layer 76 rather than by the modified layer 74, thus being overmoulded on the outer layer 76 to become integral with or part of the outer layer 76, or being bonded or welded to the outer layer 76.

Figure 8:
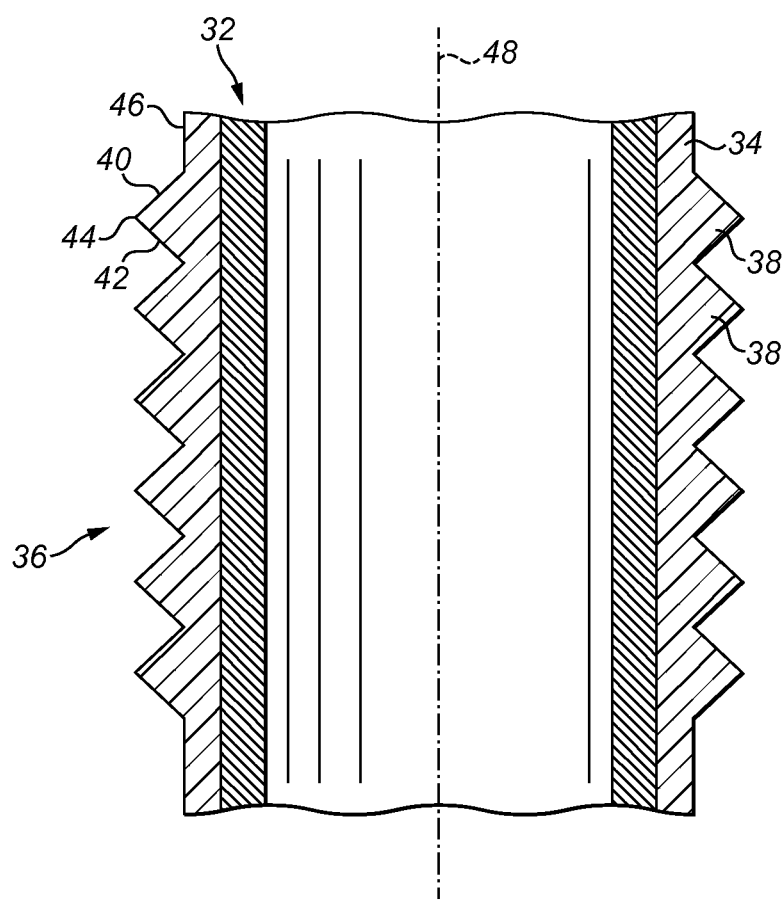
FIG. 8 corresponds to FIG. 4 but shows a variant of the hold-back formations and omits the bushing.

FIG. 8 corresponds to FIG. 4 but shows a variant of the hold-back formations 36 and omits the bushing 50 for clarity. Like numerals are used for like parts. In this variant, it will be apparent that the upper and lower faces 40, 42 of the ribs 38 are equally and oppositely inclined relative to the central longitudinal axis 48. For example, the upper and lower faces 40, 42 of the ribs 38 may each be inclined at about 45° to the central longitudinal axis 48 as shown.

Figure 9:
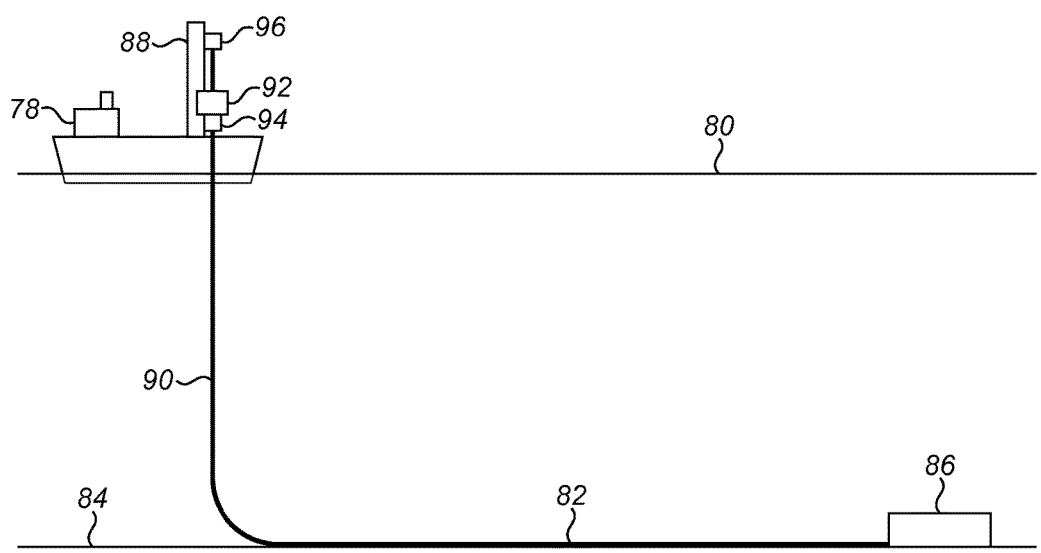
FIG. 9 is a schematic sectional side view of a J-lay vessel in the process of pipelaying, showing the invention in its context of use.

Finally, FIG. 9 puts the invention into its context of use by showing a pipelaying vessel 78 on the surface 80 of the sea performing a J-lay operation to install a rigid subsea pipeline 82 onto the seabed 84. In this example, the pipeline 82, when installed, serves as a flowline to carry production fluids from or to a subsea structure 86 on the seabed 84, such as wellhead or a termination module. In reality, the water depth will be very much greater than is represented schematically here.

The vessel 78 has an upright J-lay tower 88 into which pipe joints 32 shown in FIGS. 3 to 7b are lifted to be welded to the top of a pipe string 90 that hangs as a catenary toward the seabed 84. The J-lay tower 88 is shown here as being vertical for simplicity but in practice it could be pivoted or gimballed to depart from the vertical. Welding operations are performed at a welding station 92 near the base of the tower 88.

A fixed lower bushing 94 beneath the welding station 92 and a travelling upper bushing or clamp 96 on the J-lay tower 88 support the pipe string 90 in alternation. Thus, the lower bushing 94 and the travelling clamp 96 are each arranged to engage with hold-back formations 36 of the invention surrounding a thermal coating 34 of the pipe joints 32 as shown in FIGS. 3 to 7b. In conventional fashion, the lower bushing 94 and the travelling clamp 96 cooperate in a hand-over-hand arrangement to lower the pipe string 90 as successive pipe joints 32 are added.

The invention claimed is:

1. A pipe joint for offshore fabrication and installation of a pipeline in a J-lay operation, the pipe joint comprising:
   a length of pipe;
   a thermally-insulating coating around the length of pipe; and
   a radially outer surface shaped to define a series of external radially-projecting hold-back formations disposed in longitudinal succession along the pipe joint, the hold-back formations configured to facilitate suspending of the pipe joint during the J-lay operation, each hold-back formation being a ridge that extends continuously around the pipe joint circumferentially;
   wherein the coating extends continuously along the pipe on a radially inner side of each hold-back formation and is interposed between each hold-back formation and the pipe;
   and wherein when a central longitudinal axis of the pipe joint is upright a downwardly-facing face of each hold-back formation has a substantially frusto-conical surface inclined at an acute angle relative to the central longitudinal axis of the pipe joint.

2. The pipe joint of claim 1, wherein the, or each, hold-back formation is integral with the coating.

3. The pipe joint of claim 1, wherein the, or each, hold-back formation is overmoulded onto the coating.

4. The pipe joint of claim 1, wherein the, or each, hold-back formation is bonded or welded to the coating.

5. The pipe joint of claim 4, wherein the, or each, hold-back formation is supported by a shell that is bonded or welded to the coating.

6. The pipe joint of claim 1, wherein the, or each, hold-back formation is wholly or predominantly of plastics material.

7. The pipe joint of claim 1, wherein:
   the coating is a layered coating that comprises at least one layer modified for additional thermal insulation and an outer mechanically-protective layer around the or each modified layer; and
   the hold-back formations are integral with or attached to the outer mechanically-protective layer.

8. The pipe joint of claim 1, wherein the ridge is defined by a pair of oppositely-inclined substantially frusto-conical faces that converge with each other in a radially outward direction.

9. The pipe joint of claim 8, wherein the faces of the pair have differing acute angles of inclination relative to the central longitudinal axis of the pipe joint.

10. The pipe joint of claim 9, wherein when the central longitudinal axis of the pipe joint is upright, an upper face of the pair has a greater angle of inclination relative to that axis than a lower face of the pair.

11. The pipe joint of claim 1, comprising a series of hold-back formations disposed in longitudinal succession along the pipe joint.

12. A hold-back bushing or traveling clamp for use in J-lay operations, the bushing or clamp being annular and having a radially inner surface shaped to engage with one or more external hold-back formations projecting radially from a pipe joint and configured to facilitate suspending of the pipe joint during a J-lay operation, the or each hold-back formation being a ring that extends continuously around the pipe joint circumferentially;
   wherein the inner surface comprises at least one circumferentially-extending groove arranged to receive the or each of said hold-back formations, the or each groove defined by a pair of oppositely-inclined generally frusto-conical faces that converge with each other in a radially outward direction, the faces of the pair having differing acute angles of inclination relative to a central longitudinal axis of the bushing or clamp.

13. The bushing or clamp of claim 12, wherein when the central longitudinal axis of the bushing or clamp is upright, an upper face of the pair has a greater angle of inclination relative to that axis than a lower face of the pair.

14. The bushing or clamp of claim 12, comprising a series of grooves disposed in longitudinal succession.

15. In combination, a bushing or clamp of and a pipe joint for offshore fabrication and installation of a pipeline in a J-lay operation, the pipe joint comprising:
   a length of pipe;
   a thermally-insulating coating around the length of pipe; and
   a radially outer surface shaped to define a series of external radially-projecting hold-back formations disposed in longitudinal succession along the pipe joint, the hold-back formations configured to facilitate suspending of the pipe joint during the J-lay operation, each hold-back formation being a ridge that extends continuously around the pipe joint circumferentially;
   wherein the coating extends continuously along the pipe on a radially inner side of each hold-back formation and is interposed between each hold-back formation and the pipe;
   wherein when a central longitudinal axis of the pipe joint is upright, a downwardly-facing face of each hold-back formation has a substantially frusto-conical surface inclined at an acute angle relative to the central longitudinal axis of the pipe joint;
   the bushing or clamp being annular and having an inner surface comprising circumferentially-extending grooves opposed to and complementary with each hold-back formation of the pipe joint to receive each of said hold-back formations, each groove being defined by a pair of oppositely-inclined generally frusto-conical faces that converge with each other in a radially outward direction, the faces of the pair having differing acute angles of inclination relative to a central longitudinal axis of the bushing or clamp.

16. A method of manufacturing a pipe joint for offshore fabrication and installation of a pipeline in a J-lay operation, the method comprising:
   applying a thermally-insulating coating onto a length of pipe; and
   forming or attaching a series of external radially-projecting hold-back formations onto the coating so the formations are disposed in longitudinal succession along the pipe joint, the or each hold-back formation being a ridge that extends continuously around the pipe joint circumferentially and being configured to facilitate suspending of the pipe joint during the J-lay operation;
   wherein the hold-back formations are formed or attached such that when a central longitudinal axis of the pipe joint is upright, a downwardly-facing face of each hold-back formation has a substantially frusto-conical surface inclined at an acute angle relative to the central longitudinal axis of the pipe joint.

17. The method of claim 16, comprising overmoulding the, or each, hold-back formation onto the coating.

18. The method of claim 16, comprising bonding or welding the, or each, hold-back formation onto the coating.

19. The method of claim 18, comprising bonding or welding a shell onto the coating, which shell supports one or more hold-back formations.

20. A J-lay method for offshore fabrication and installation of a pipeline, the method comprising:
attaching a pipe joint to an upper end of a pipe string catenary suspended from an installation vessel, the pipe joint comprising a thermally-insulating coating around a length of pipe, which coating extends continuously along the pipe and is interposed between the pipe joint and a series of external radially-projecting hold-back formations disposed in longitudinal succession along the pipe, each hold-back formation being a ridge that extends continuously around the pipe joint circumferentially and being configured to facilitate suspending of the pipe joint during a J-lay operation, wherein when a central longitudinal axis of the pipe joint is upright, a downwardly-facing face of each hold-back formation has a substantially frusto-conical surface inclined at an acute angle relative to the central longitudinal axis of the pipe joint; and
holding back a weight load of the catenary using a bushing or clamp of the vessel engaged with each hold-back formation.

21. The method of claim 20, wherein the weight load is transferred from the catenary to the bushing or clamp by shear forces acting through the coating.

22. The method of claim 21, comprising transferring the weight load from the coating to the bushing or clamp through a lower face of at least one radially-projecting hold-back formation to an opposed face of the bushing or clamp, which faces are inclined at matching acute angles relative to a common central longitudinal axis.

23. The method of claim 20, wherein the pipe joint is loaded onto the installation vessel with the or each hold-back formation already provided on the pipe joint.

* * * * *